United States Patent
Attee

(10) Patent No.: US 6,361,095 B1
(45) Date of Patent: Mar. 26, 2002

(54) ADJUSTABLE STROKE GRIPPER ASSEMBLY

(75) Inventor: Keith S. Attee, Charlevoix, MI (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

(21) Appl. No.: 09/606,962

(22) Filed: Jun. 29, 2000

(51) Int. Cl.$^7$ ................................................. B25J 15/08
(52) U.S. Cl. ..................................... 294/119.1; 294/88
(58) Field of Search ........................... 294/8.8, 93, 97, 294/115, 116, 119.1; 269/30, 32, 34, 228, 233; 279/4.1, 4.12, 110, 118, 119; 901/31, 36, 37–51

(56) References Cited

U.S. PATENT DOCUMENTS

| | | |
|---|---|---|
| 1,412,961 A | 4/1922 | Periolat |
| 1,543,037 A | 6/1925 | Teeter |
| 2,212,156 A | 8/1940 | Erdley |
| 2,381,657 A | 8/1945 | Eksergian et al. |
| 2,791,623 A | 5/1957 | Lock et al. |
| 3,013,835 A | 12/1961 | Blatt |
| 3,350,132 A | 10/1967 | Ashton |
| 3,403,901 A | 10/1968 | Servadio |
| 3,482,830 A | 12/1969 | Sendoykas |
| 3,568,959 A | 3/1971 | Blatt |
| 3,613,904 A | 10/1971 | Blatt |
| 3,635,514 A | 1/1972 | Blatt |
| 3,655,233 A | 4/1972 | Twist |
| 3,815,479 A | 6/1974 | Thompson |
| 3,997,894 A | 12/1976 | Ratkowski |
| 4,109,953 A | 8/1978 | Seymour |
| 4,111,100 A | 9/1978 | Boyer |
| 4,119,017 A | 10/1978 | Nusbaumer et al. |
| 4,132,153 A | 1/1979 | Grotness et al. |
| 4,134,306 A | 1/1979 | Grotness et al. |
| 4,211,123 A | 7/1980 | Mack |
| 4,234,223 A | 11/1980 | O'Neil |
| 4,243,257 A | 1/1981 | Shackleford |
| 4,244,618 A | 1/1981 | Boyer et al. |
| 4,275,872 A | 6/1981 | Mullis |
| 4,307,864 A | 12/1981 | Benoit |
| 4,368,913 A | 1/1983 | Brockmann et al. |
| 4,421,137 A | 12/1983 | Nusbaumer et al. |
| 4,473,249 A | 9/1984 | Valentine et al. |
| 4,484,775 A | 11/1984 | Norkus |
| 4,496,138 A | 1/1985 | Blatt |
| 4,518,187 A | 5/1985 | Blatt et al. |
| 4,570,914 A | 2/1986 | Blatt |
| 4,577,898 A | 3/1986 | Nusbaumer et al. |
| 4,596,415 A | 6/1986 | Blatt |
| 4,607,873 A | 8/1986 | Nusbaumer et al. |
| 4,620,696 A | 11/1986 | Blatt |
| 4,647,097 A | 3/1987 | Lessway |
| 4,647,100 A | 3/1987 | Lessway |

(List continued on next page.)

Primary Examiner—Robert E. Pezzuto
(74) Attorney, Agent, or Firm—Van Dyke, Gardner, Linn & Burkhart, LLP

(57) ABSTRACT

An adjustable stroke gripper assembly includes an adjustment member carried by a housing. The adjustment member is movable between at least a first and a second position, whereby when in the first position, retraction of the drive member moves the pair of jaws of the gripper assembly to a first open position defining a first angle therebetween, and when the adjustment member is moved to the second position, the pair of jaws open to a second open position defining a second angle which is different than the first angle. The adjustment member of the gripper assembly permits the stroke of the gripper to be adjusted to grasp workpieces of differing dimensions, and also to enable the use of the gripper assembly in environments wherein clearance requires the jaws to open to a particular angle. Furthermore, the adjustment member permits the jaw angle to be varied without replacing the pair of jaws.

59 Claims, 10 Drawing Sheets

U.S. PATENT DOCUMENTS

| | | |
|---|---|---|
| 4,650,237 A | 3/1987 | Lessway |
| 4,662,668 A | 5/1987 | Hufford |
| 4,728,137 A | 3/1988 | Hamed et al. |
| 4,765,669 A | 8/1988 | Meier |
| 4,941,481 A | 7/1990 | Wagenknecht |
| 4,957,318 A | 9/1990 | Blatt |
| 5,069,433 A | 12/1991 | Womac |
| 5,072,652 A | 12/1991 | Blatt |
| 5,125,632 A | 6/1992 | Blatt et al. |
| 5,152,568 A | 10/1992 | Blatt |
| D334,701 S | 4/1993 | Blatt et al. |
| 5,241,896 A | 9/1993 | Braun et al. |
| 5,261,715 A | 11/1993 | Blatt et al. |
| 5,269,486 A | 12/1993 | Hufford |
| 5,271,651 A | 12/1993 | Blatt et al. |
| 5,299,847 A | 4/1994 | Blatt et al. |
| 5,411,232 A | 5/1995 | Hufford |
| 5,503,447 A | 4/1996 | Pozerycki |
| 5,516,173 A | 5/1996 | Sawdon |
| 5,575,462 A | 11/1996 | Blatt |
| 5,634,629 A | 6/1997 | Blatt |
| 5,647,625 A | 7/1997 | Sawdon |
| 5,657,972 A | 8/1997 | Blatt |
| 5,688,349 A | 11/1997 | Herum |
| 5,762,325 A | 6/1998 | Blatt |
| 5,782,571 A | 7/1998 | Hufford et al. |
| 5,791,619 A | 8/1998 | Myers |
| 5,799,932 A | 9/1998 | Blatt |
| 5,829,112 A | 11/1998 | Blatt |
| 5,875,417 A | 2/1999 | Golden |
| 5,938,257 A | 8/1999 | Blatt |
| 5,941,513 A | 8/1999 | Moilanen et al. |
| 5,988,042 A | 11/1999 | Lamle |
| 6,003,850 A | 12/1999 | Crorey |
| 6,019,409 A | 2/2000 | Steele et al. |
| 6,024,392 A | 2/2000 | Blatt |
| 6,048,013 A | 4/2000 | Moilanen et al. |
| 6,056,281 A | 5/2000 | Moilanen et al. |
| 6,079,896 A | 6/2000 | Dellach |
| 6,123,375 A | 9/2000 | Fussey et al. |
| 6,125,684 A | 10/2000 | Moilanen et al. |

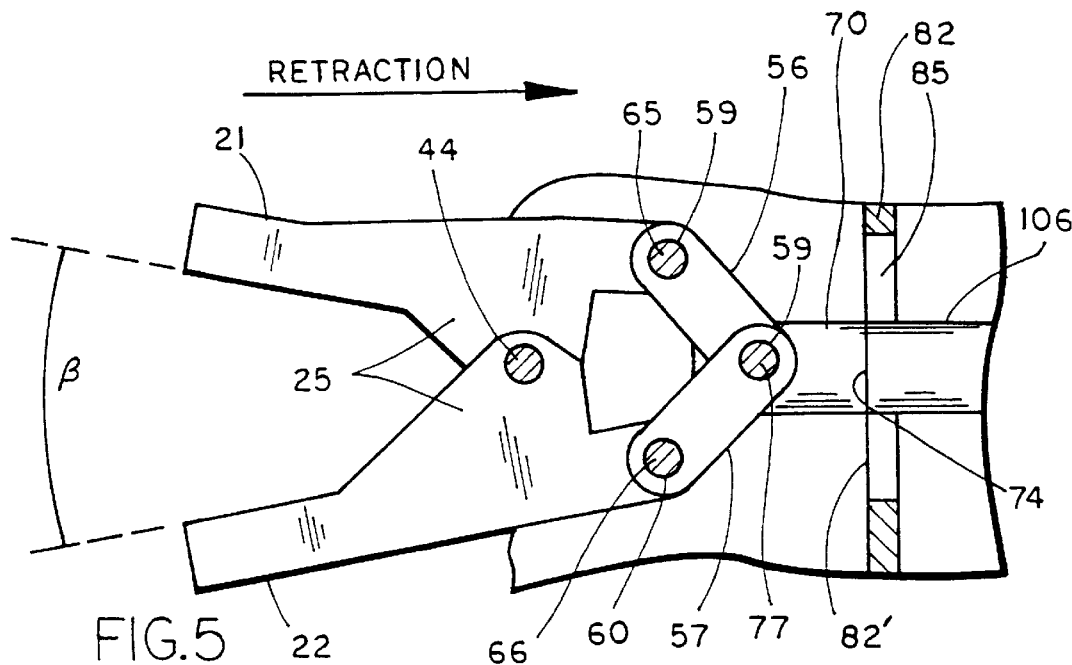
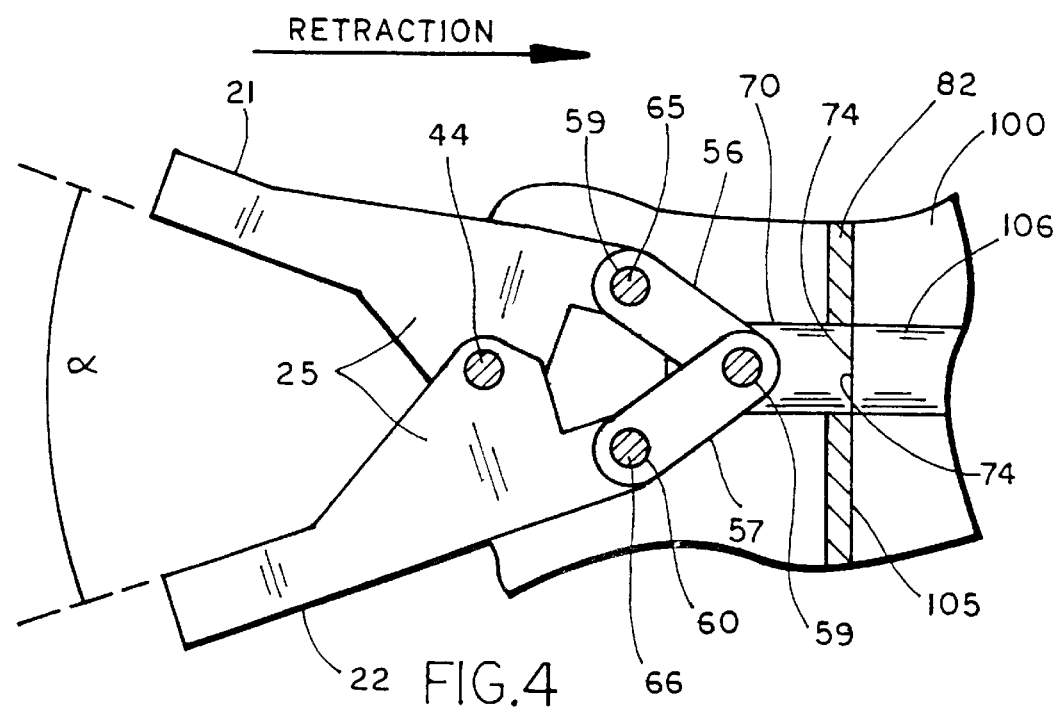

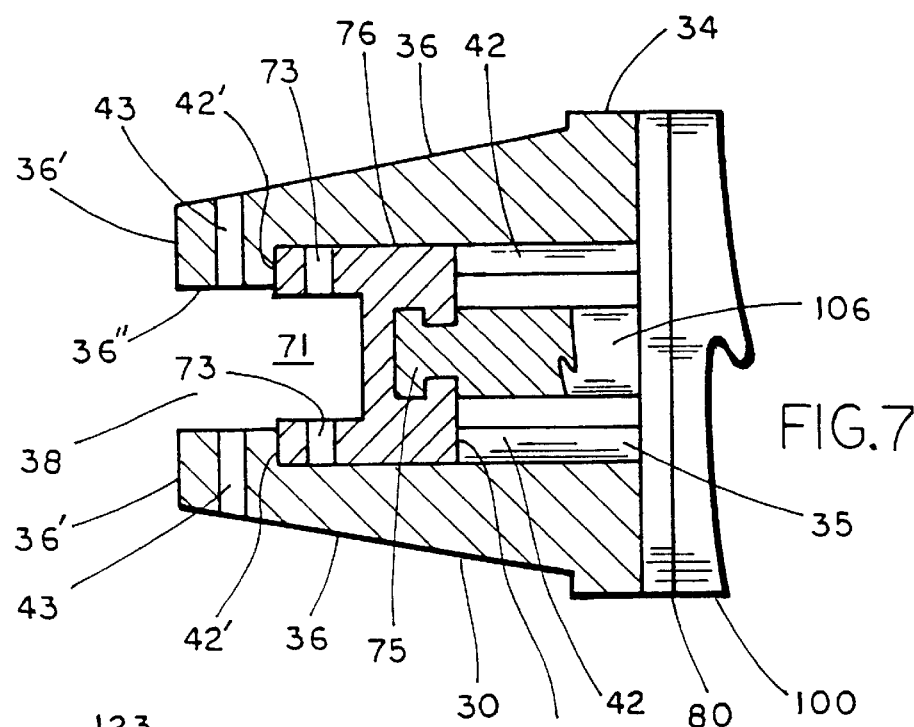
FIG.7
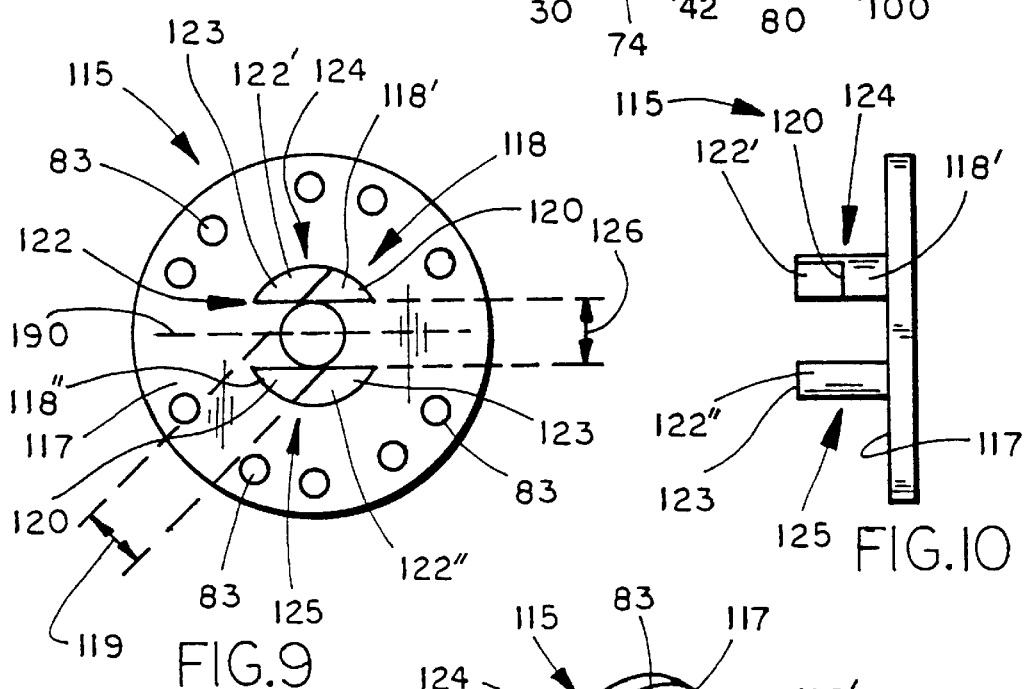
FIG.9
FIG.10
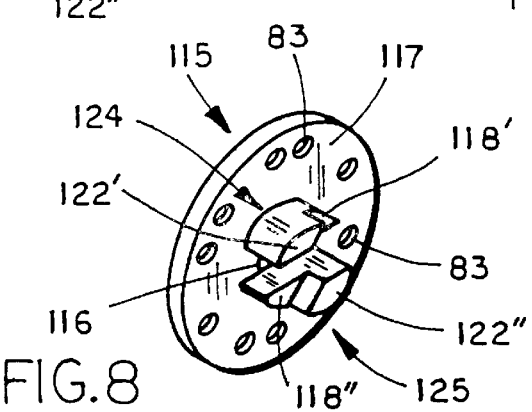
FIG.8

ADJUSTABLE STROKE GRIPPER ASSEMBLY

BACKGROUND OF THE INVENTION

The present invention relates generally to gripper assemblies, and in particular to an industrial gripper assembly having an adjustable stroke.

In today's automated manufacturing facility, it is customary to employ automated gripper assemblies to grasp a particular workpiece and transfer that workpiece to a new location where further processing can be conducted. These automated gripper assemblies are common place in industrial and manufacturing facilities, and are utilized to grasp a variety of industrial parts necessary for the manufacture of a particular device or component.

In many instances, a particular application requires the gripper assembly to grasp a workpiece located in an environment wherein there is only limited clearance for the gripper assembly to operate. That is, the jaws of the gripper assembly, when in the open position necessary to place the inner surfaces of the jaw about the exterior of the workpiece, must open only to a preselected angle so as to permit entrance or navigation about the environment in which the workpiece is located. Failure of the gripper assembly to operate within the limited clearance results in the inability of the gripper assembly to retrieve the object. Furthermore, if the angle at which the jaws are opened is greater than the clearance provided by the application, the jaws may contact the surrounding structure, often at enhanced speeds, and hence damage both the gripper assembly and surrounding structure.

In view of the space constraints placed upon a gripper assembly in many applications, the industry has advanced gripper assemblies having an adjustable stroke so as to enable adjustment of the angle or distance between the jaws when in the open position. However, these prior art adjustable stroke gripper assemblies are often complex and, as a result, relatively expensive. Furthermore, many of these prior art gripper assemblies require interchanging the jaw assembly to accommodate different clearance parameters. In most industrial applications, the gripper assembly will be required to transfer a variety of different workpieces located in different environments and having different clearance parameters. Thus, when there is a change in the workpiece to be transferred, or the environment in which it is positioned, it is often the case that the jaw assembly must be removed and a second jaw assembly inserted to thereby accommodate the different operating parameters. This jaw replacement procedure is cumbersome and often must be accomplished manually, and necessarily reduces the efficiency of the transfer process. Also, employing different jaw assemblies to accommodate different workpieces and their environments is relatively expensive and increases manufacturing costs. Moreover, repeatedly switching jaw assemblies tends to decrease the precision with which the transfer process is accomplished.

Consequently, there exists a need for an adjustable stroke gripper assembly which can be easily adjusted to accommodate different clearance requirements without replacing the jaw assembly.

SUMMARY OF THE INVENTION

Accordingly, the present invention provides a gripper assembly configured to adjustably alter the stroke of the jaw assembly, and thus alter angle defined by the jaws in the open position. Specifically, the gripper assembly is configured to permit the alteration of the jaw angle without having to replace the jaw assembly, and consequently, increases the efficiency and precision of the transfer process.

According to one aspect of the invention, a gripper assembly for use with a drive assembly having a drive member includes a housing connected to the drive assembly, and a jaw assembly carried by the housing and operably connected to the drive assembly. The jaw assembly includes a pair of jaws having at least a first open position and a second open position, each of which opens the pair of jaws to a different, preselected angle. A connection assembly operably connects the drive member to the pair of jaws. An adjustment member, carried by the housing, has a contact surface and is movable between at least a first and a second position, such that the pair of jaws open to a first open position and the connection assembly does not contact the contact surface when the adjustment member is in the first position, while the pair of jaws open to a second open position wherein the connection assembly contacts the contact surface when the adjustment member is in the second position. Providing an adjustment member carried by the housing of a gripper assembly for enabling the jaws of the housing to open to at least two distinct open positions, depending upon the position of the adjustment member, simplifies the transfer procedure, and enables different workpieces or parts to be effectively grasped in different clearance environments without switching the jaw assembly.

According to another aspect of the invention, a gripper assembly for use with a drive assembly having a drive member includes a pair of jaws attached to the housing and operably connected to the drive member by a connector member. An adjustment member, carried by the housing, has a stop surface selectively contacting the connector member such that when placed in a first position, the pair of jaws assume a first open position defining a first angle, whereas movement of the adjustment member into a second position results in contact between the connector member and the stop surface and permits the jaws to assume a second open position defining a second angle which not equal to the first angle. The second angle is determined by the spacing between the stop surface of the adjustment member and the drive assembly, and thus, permits the gripper assembly to assume any angular range required by the particular application.

According to still another aspect of the invention, a gripper assembly for use with a drive assembly having a drive member includes a housing connected to the drive assembly, and a pair of jaws carried by the housing, with at least one of the jaws pivotally attached to the housing. The jaws are operable between a closed position and at least one open position by movement of a connector member attached to the drive member and slidingly received by the housing. A pair of toggles are attached to the jaws and pivotally attached to the connector member. Sliding receipt of a connector member within the housing provides an effective and reliable structure for opening and closing the jaws of a gripper assembly.

According to still yet another aspect of the invention, a method for adjusting the stroke of a gripper assembly includes the step of providing an adjustment member having a preselected thickness and positioned between a drive assembly and the gripper assembly housing. The adjustment member is movable between at least a first and a second position, and when in the first position, enables the pair of jaws to open to a first open position, while movement to the second position opens the jaws to a second open position. Altering the position of an adjustment member to achieve different jaw angles reduces the manufacturing and operational complexity of the gripper assembly, thus reducing costs while increasing reliability. Further, employing an adjustment member capable of altering the stroke or jaw angle results in a gripper assembly capable of operating in various clearance environments without having to switch the jaws.

According to a further aspect of the invention, a gripper apparatus includes a housing, a jaw assembly carried by the housing and having a pair of jaws movable between a closed position and at least a first and a second open position. An adjustment member is attached to the housing and movable between at least a first position and a second position. The adjustment member is formed with a central cutout section or aperture, so that a drive member of a drive assembly extends through the cutout section and is operably connected to the pair of jaws. When the adjustment member is in the first position, and the drive member is in the retracted position, the jaws open to the first open position, while movement of the adjustment assembly to the second position results in the opening of the pair of jaws to the second open position. The gripper apparatus of the present invention which utilizes an adjustment member having a cutout section through which a drive member extends provides a reliable and effective structure to thereby increase or decrease the distance between the jaws in the open position.

According to an additional aspect of the invention, a gripper assembly for use with a drive assembly having a drive member includes a housing, a connector member movably positioned within the housing and operably connected to the drive member, and a toggle assembly pivotably connected to the connector member. A first jaw and a second jaw are rotatably attached to the housing and operably joined to the connector member by a toggle assembly. The connector member moves in the axis of travel with the drive member, and hence provides an efficient structure for opening and closing a pair of jaws.

These and other features and advantages of the present invention will be further understood and appreciated by those skilled in the art by reference to the following specification when read in conjunction with the accompanying drawings.

BRIEF DESCRIPTION OF THE DRAWINGS

FIG. 4 is a sectional view taken along line IV—IV of FIG. 1 illustrating the pair of jaws open to a first open position when the adjustment member is in the first position and the drive member is in the retracted position;

FIG. 5 is the same view as FIG. 4 with the jaws open to a second open position when the adjustment member is in the second position, and the drive member is in the retracted position;

FIG. 7 is a sectional view taken along line VII—VII of FIG. 1, depicting the position of the connector member within the channels of the housing;

FIG. 8 is a perspective view of an adjustment member according to an alternative preferred embodiment of the invention;

FIG. 9 is a front view of the adjustment member depicted in FIG. 8;

FIG. 10 is a side view of the adjustment member depicted in FIGS. 8 and 9;

DESCRIPTION OF THE PREFERRED EMBODIMENTS

Figure 1:
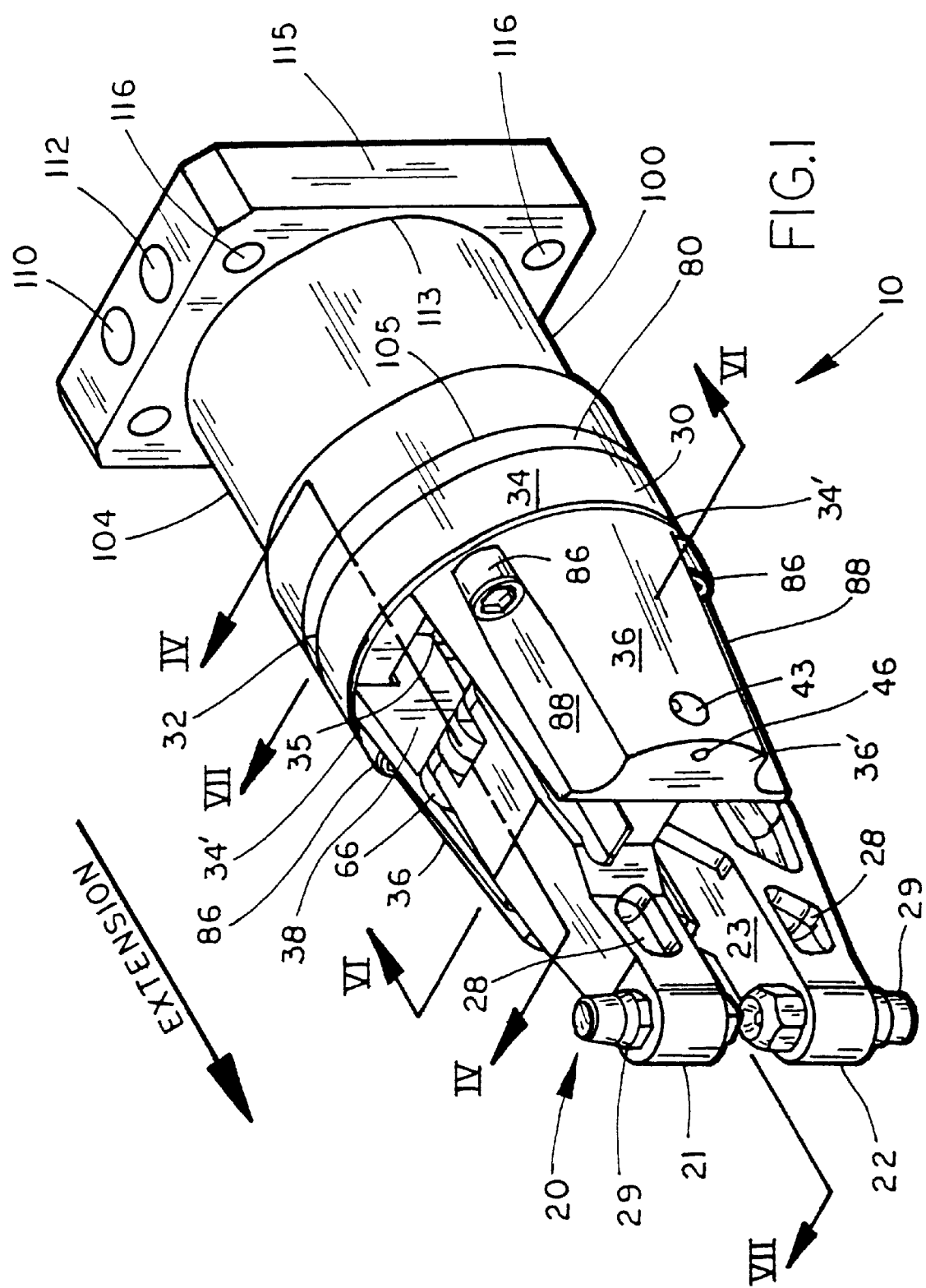
FIG. 1 is a perspective view of a gripper assembly, illustrated attached to a drive assembly, according to the invention.

The present invention overcomes the problems encountered by the prior art by advancing a gripper assembly configured to adjustably vary the stroke or angle between the jaws when in the open position. This adjustablity is accomplished by an adjustment member carried by the gripper assembly, which eliminates the need for replacing the jaw assembly when different workpieces are to be transferred, or the environment in which the workpiece resides requires the jaws to open only to a preselected angle due to clearance requirements.

Referring now to the drawings, and in particular, FIGS. 1–7, and the illustrative embodiments depicted therein, wherein like reference numerals correspond to like elements in the several drawings, there is shown a gripper assembly 10 according to the present invention which includes a jaw assembly 20, defined by jaws 21 and 22, carried by a housing 30. Rear surface 32 of housing 30 is removably attached to a drive assembly 100. Drive assembly 100 includes a drive member 102 extending therefrom in a preselected direction of travel.

Drive member 102 is operably connected to a connector member 70 carried by housing 20. Connector member 70 is pivotably attached to jaw assembly 20 by a toggle assembly 50. Thus, connector member 70 and toggle assembly collectively define a connection assembly for connecting jaw assembly 20 and drive member 102. An adjustment member 80 is adjustably carried between rear surface 32 of housing 30 and drive assembly 100, and is configured to adjust the stroke of jaw assembly 20, and therefore alter the angle assumed by jaw assembly 20 when in the open position.

Drive assembly 100 may be any drive assembly normally encountered in the art capable of actuating gripper assembly 10. Attached to rear surface 113 of drive assembly 100, by any means commonly employed in the art, is a mounting plate 115. Mounting plate 115 has one or more throughholes 116 enabling gripper assembly 10 to be mounted to any structure commonly utilized in the art, by the use of suitable fasteners. Preferably, drive assembly 100 is a hydraulic piston 104 having extending therefrom a piston rod 106 which serves as drive member 102. As is commonly known in the art, piston rod 106 is reciprocated along a preselected axis of travel by the selective injection and exhaustion of a fluid through inlet port 110 and outlet port 112 formed in mounting plate 115 and in fluid communication with piston 104. It will be recognized by those with ordinary skill in the art that any drive assembly commonly encountered in the art may be used with gripper assembly without deviating from the spirit and scope of the present invention.

Housing 20 includes a base 34 formed with a central cutout section 35 through which piston rod 106 extends. Projecting from base 34 is a pair of spaced flanges 36 which collectively define a slot 38 therebetween. Slot 38 is in communication with central cutout section 35 of base 34. Front surfaces 36' of flanges 36 are fitted with a head guard or protective member 39 secured by fasteners 41 extending through apertures 42' formed in front faces 36'. Protective members 39 prevent flanges 36 from being damaged by inadvertent contact with the workpiece or surrounding structure. Interior surface 36" of each flange 36 is formed with a channel 42 projecting substantially orthogonal from base 34 and terminating a preselected distance from front surfaces 36' of flanges 36. Each channel 42 is in communication with central cutout section 35 of base 34. Each flange 36 is further formed with a throughhole 43 positioned between end surface 42' of channel 42 and front surface 36'.

Figure 6:
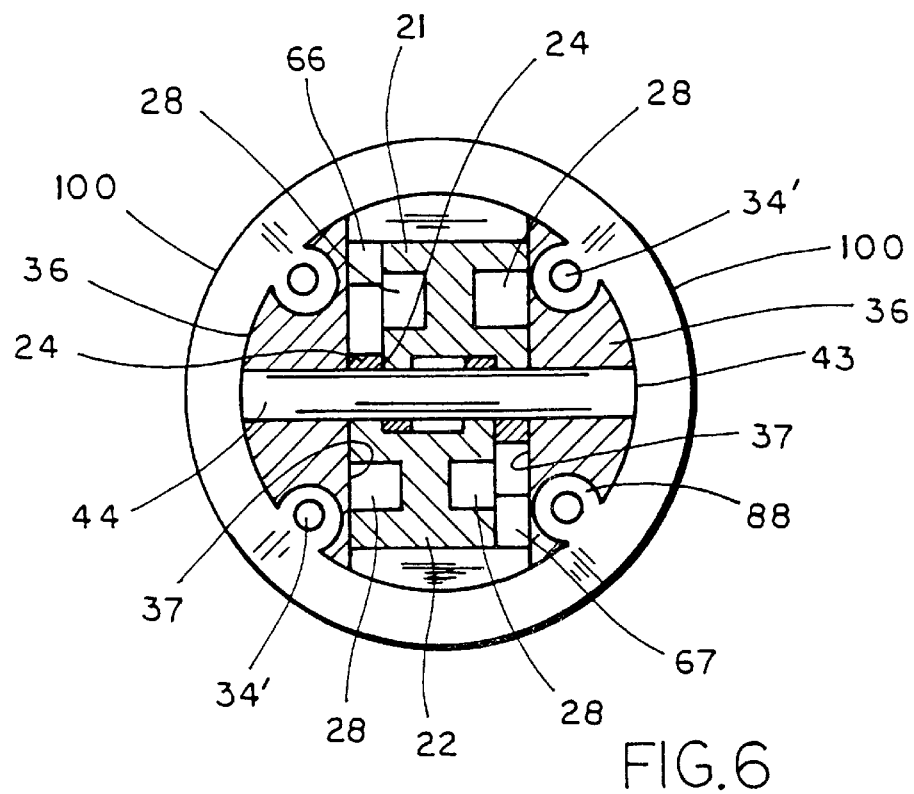
FIG. 6 is a sectional view taken along line VI—VI of FIG. 1.
Figure 12:
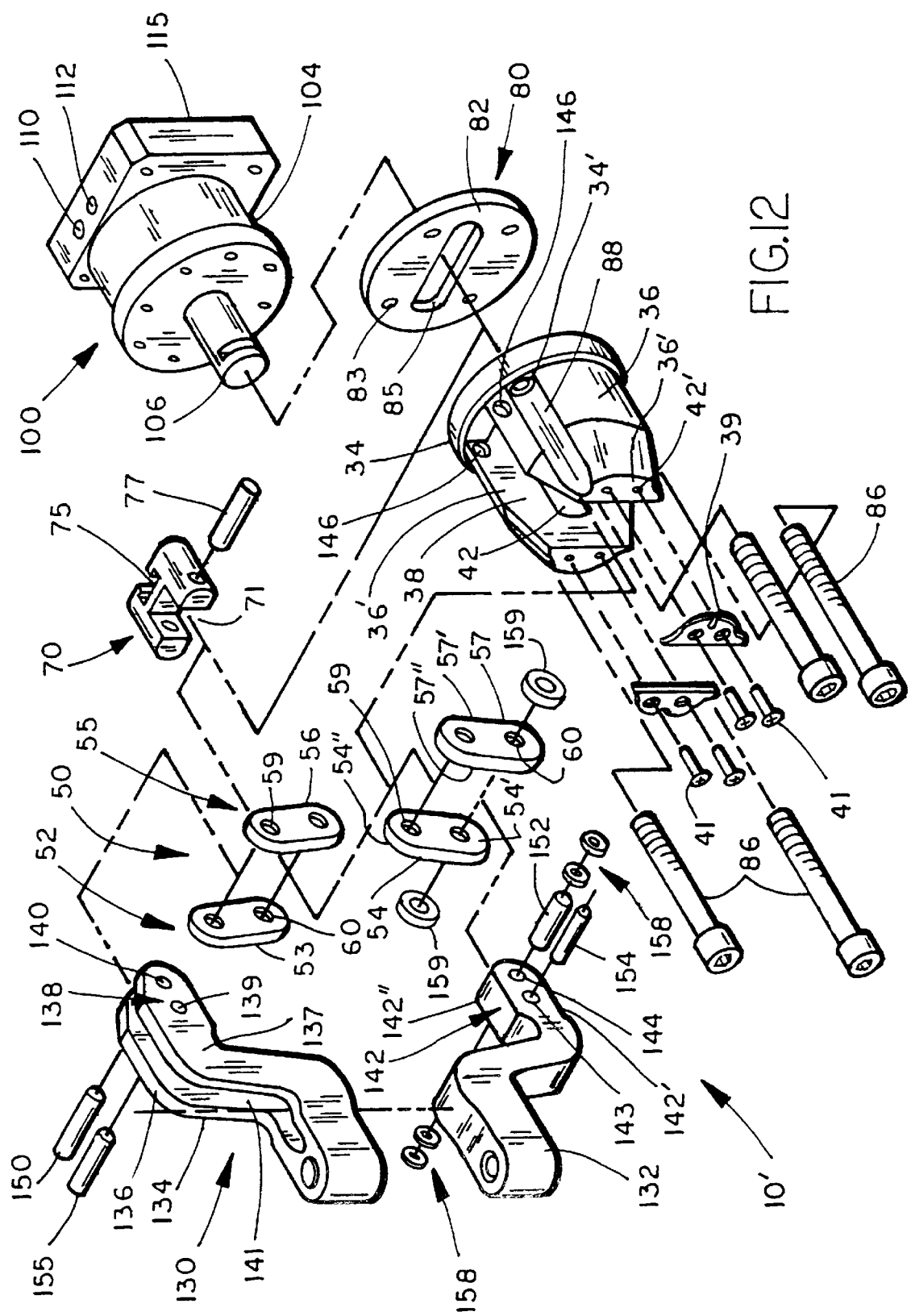
FIG. 12 is an exploded view of the gripper assembly depicted in FIG. 11.

Each jaw 21, 22, of jaw assembly 20 has a contact surface 23 formed with a pair of pivot members 24, 25 projecting therefrom. As shown in FIG. 6, when in the assembled position, jaws 21, 22 are positioned within slot 38 formed between flanges 36, such that pivot member 24 of jaw 21 will be positioned between pivot members 24 and 25 of jaw 22 with pivot member 24 of jaw 21 against interior surface 37 of flange 36, while pivot member 25 of jaw 21 will be located between pivot member 25 and interior surface 37 of the opposing flange 36. Pivot members 24, 25 of jaws 21, 22 are formed with throughholes 26, which when in the assembled position, are in registry with the throughhole 26 of the opposing jaw, as well as throughholes 43 of flanges 36. Registration of throughholes 26 of jaws 21, 22 and throughholes 43 of flanges 36 permits a pivot pin 44 to extend through throughholes 43 and 26, and hence provides a pivot axis or point for jaws 21, 22. Pivot pin 44 is maintained within flanges 36 by introduction of transverse stop pins 45 which are threaded through throughholes 46 of front surface 36' of flanges 36, and are in abutting contact with the ends of pivot pin 44.

Each jaw 21, 22 includes a pair of rear, or attachment flanges 46 and 47 projecting therefrom. Attachment flanges 46, 47 are each formed with a throughhole 48. Throughholes 48 enable pivotal attachment of jaws 21, 22 with toggle assembly 50. Toggle assembly 50 is defined by a first toggle 52 having an upper link 53 and a lower link 54, and a second toggle 55 having an upper link 56 and lower link 57. Upper links 53, 56 and lower links 54, 57 each include an upper aperture 59, and a lower aperture 60.

Upper apertures 59 of upper links 53, 56 are separated by a spacer member 61 having a throughhole 62 formed therethrough. Similarly, a spacer member 63 with throughhole 64 separates lower links 54, 57. Spacer members 61, 63 can be made of any material commonly utilized in the art. Pivotal attachment of jaws 21, 22 to toggle assembly 50 is accomplished by positioning upper links 53 and 56 between attachment flanges 46, 47 of jaw 21, and thereafter inserting a pivot pin 65 through throughholes 48 of attachment flanges 46, 47, upper apertures 59 of links 53, 56 and throughhole 62 of spacer 61. Similarly, pivotal attachment of jaw 22 to toggle assembly 50 is achieved by placing a pivot pin 66 through throughhole 48 of attachment flanges 46, 47, lower apertures 60 of links 54 and 57, and throughhole 64 of spacer 63.

A spacer 66 is positioned on the exterior surface of attachment flange of jaw 21, while a spacer 67 is positioned on the exterior surface of attachment flange of jaw 22. Spacers 66 and 67 are made of a pliable material such as a suitable polymer. When positioned within slot 38, spacers 66 and 67 securely hold jaw assembly 20 therein.

Jaws 21, 22 may be formed with a plurality of webs 28 for the purpose of reducing the overall weight of gripper assembly 10. Each jaw 21, 22 is also formed with an internally threaded front throughhole 28'. Throughholes 28' are intended to accept complimentary sections of a grasping tool 29 which assists jaws 21, 22 in securely gripping a workpiece. Various grasping tools 29 are known to those with ordinary skill in the art, and their selection will depend on the particular workpiece being transferred.

Connector member 70 includes a front cutout section 71 defining a pair of members 72, each of which is formed with a throughhole 73 in communication with front cutout section 71. Rear surface 74 of connector member 70 is formed with a generally T-shaped slot 75 through which notches 108, formed proximate to end 107 of piston rod 106, are inserted to thereby securely attach piston rod 106 to connector member 70. Side surfaces 76 of connector member 70 are preferably arcuate in shape, and are dimensioned to be received within channels 42 formed in flanges 36. When so positioned, cutout section 71 and slot 75 of connector member 70 will be positioned within slot 38 of housing 30.

Toggle assembly 50 is pivotally attached to connector member 70 by placement of a pivot pin 77 through throughholes 73 of connector member 70, and through lower apertures 60 of links 53 and 56 and upper apertures 59 of links 54 and 57. When so assembled, the respective ends of links 53, 54, 56, and 57 will be positioned within cutout section 71 of connector member 70. When links 53, 54, 56 and 57 are positioned within cutout section 71 and pivotally attached thereto by pivot pin 77, exterior surface 53' of upper link 53 will contact interior surface 54' of lower link 54. Similarly, when in the assembled position, exterior surface 57' of lower link 57 will abuttingly contact interior surface 56' of upper link 56.

Adjustment member 80, in a preferred form, is a generally circular plate 82 having one or more attachment throughholes 83 positioned proximate to perimeter 84. Plate 82 is formed with a central cutout section or aperture 85. Central aperture 85 is dimensioned to enable piston rod 106 or other drive member 102 to extend therethrough and further, to permit at least a section of connector member 70 to pass therethrough when in a particular orientation, and is formed having a preselected thickness measured from front surface 82' to rear surface 82". Central aperture 85 may assume any shape capable of enabling piston rod 106 and at least a section of connector member 70 to pass therethrough in one orientation, while not permitting connector member 70 to pass therethrough when in another orientation. Preferably, central aperture 85 has the same shape as connector member 70. Adjustment member 80 is attached between rear surface 32 of housing 30 and front surface 105 of piston 104 by threading screws 86, or like fasteners, through throughholes 34' formed in base 34, attachment throughholes 83 of adjustment member 80, and corresponding throughholes 109 formed in front surface 105 of piston 104. Formed on the exterior surface of flanges 36 of housing 30 are plurality of arcuately shaped cutout sections 88 extending axially along the axis defined by throughholes 34' of base 34. Arcuate channels 88 facilitate the insertion and removal of screws 86 from throughholes 34' of base 34, and thereby expedite the adjustment of adjustment member 80.

In operation, at the full extension of piston rod 106 labeled by directional arrow as Extension in FIG. 1, jaw assembly 20 will be in the closed position. Retraction of piston rod 106 by piston 104 in the direction indicated by the directional arrow labeled Retraction in FIGS. 4 and 5 causes the sliding movement of connector member 70 within channels 42, towards base 34. As connector member 70 moves towards base 34, the pivotal movement of toggle assembly 50 results in the opening or pivoting of jaws 21, 22 about the pivot axis defined by pivot pin 44. Specifically, retraction of piston rod 106 enables the stroke, or angular position between jaws 21, 22 to assume one of a first open position and a second open position determined by the position of adjustment member 80.

Figure 2:
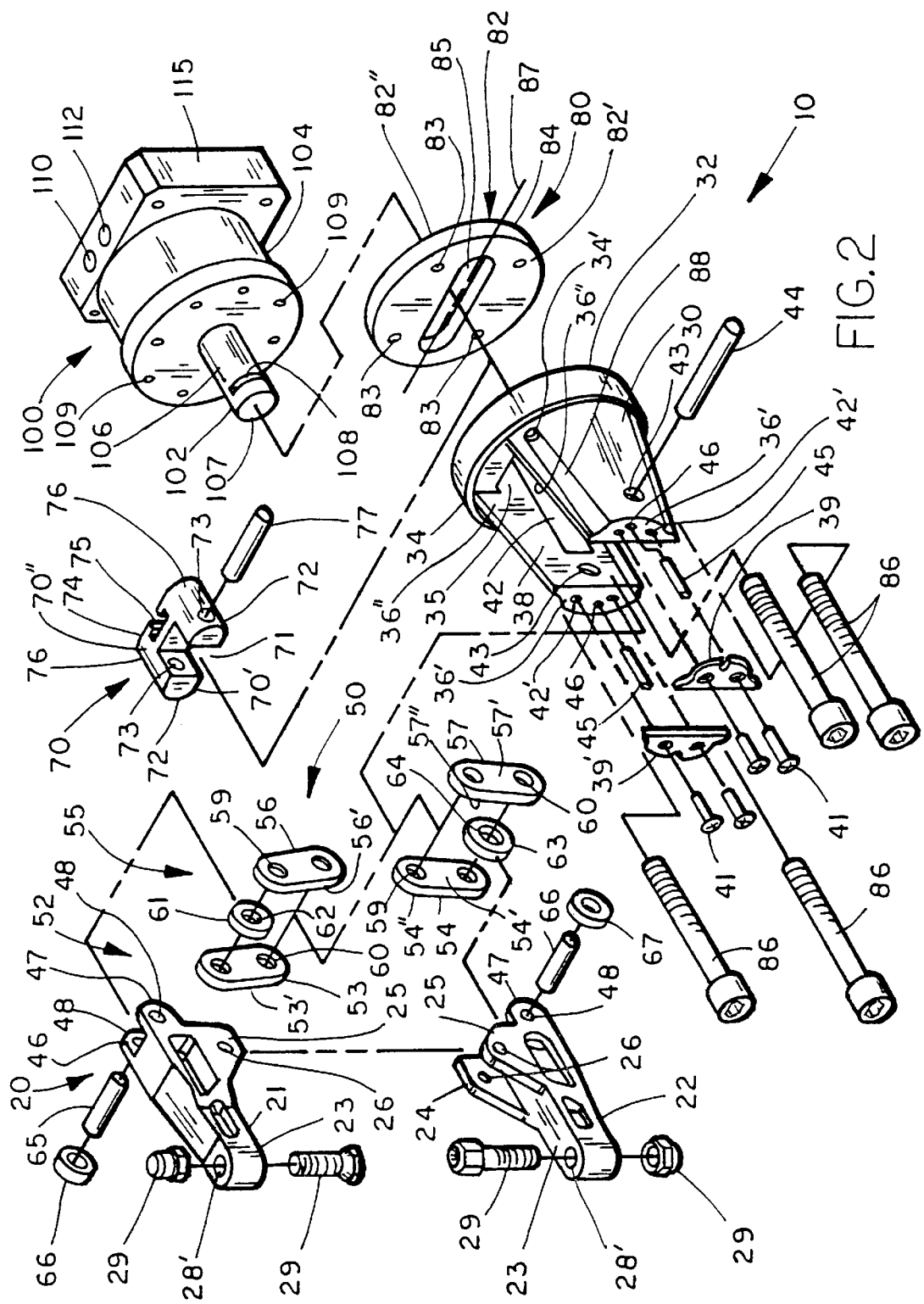
FIG. 2 is an exploded perspective view of the gripper assembly of FIG. 1, with the adjustment member illustrated in the first position.

When adjustment member 80 is in the position illustrated by FIGS. 2 and 4, connector member 70 will extend, at least partially, through central aperture 85 of adjustment member 80 as piston rod 106 is retracted to thereby open jaws 21, 22 to a first open position defined by a preselected first angle α. When adjustment plate 80 is so positioned, upon full retraction of piston rod 106, rear surface 74 will abuttingly contact front surface 105 of piston 104, and thus, in the first position, front surface 105 acts as a contact or stop surface.

Figure 3:
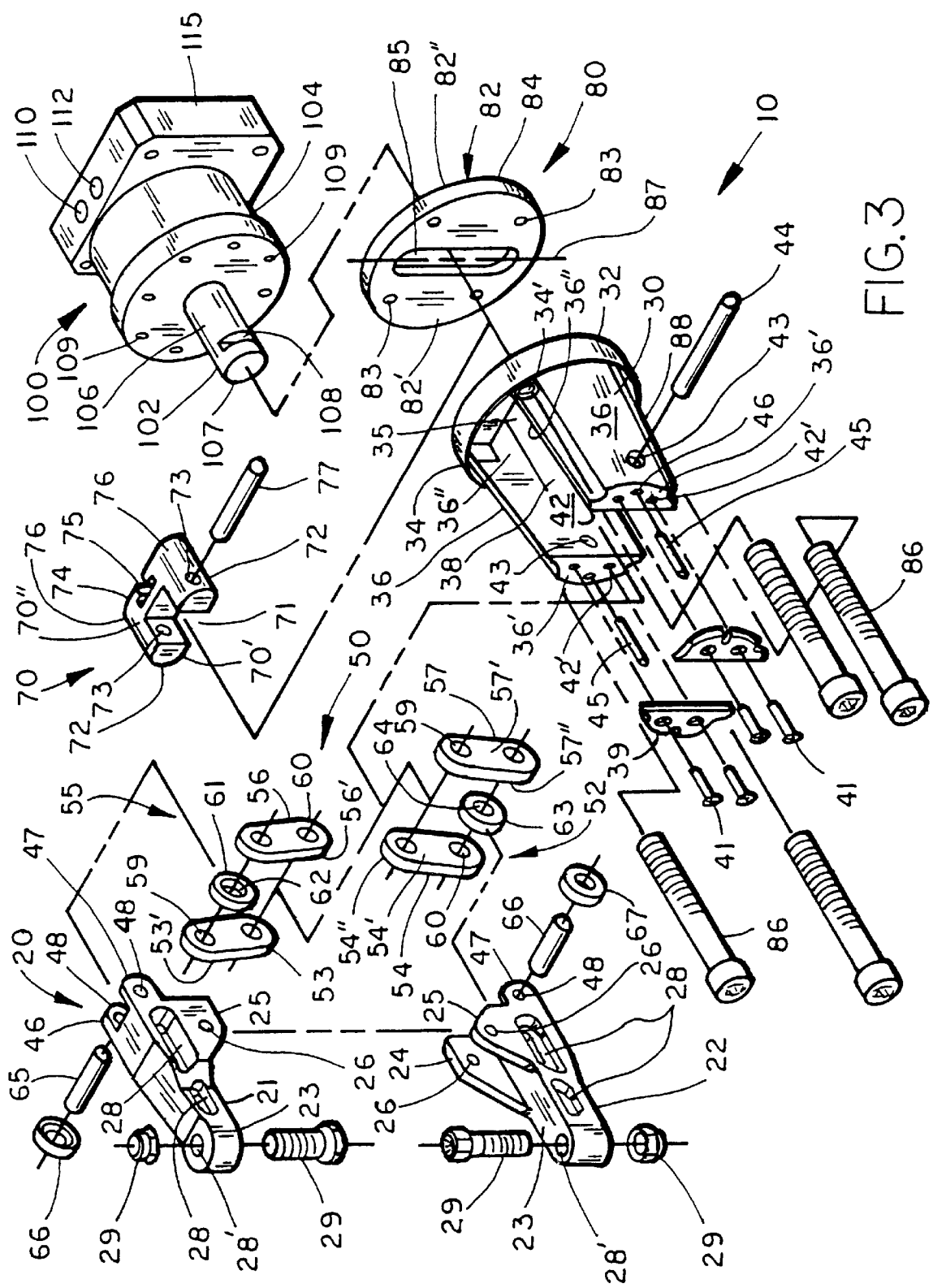
FIG. 3 is the same view as FIG. 2 with the adjustment member shown in the second position.

Adjustment of adjustment member 80 to the position illustrated in FIGS. 3 and 5, wherein the plane defined by major dimension 87 of central aperture 85 is not horizontal, and is preferably vertical, retraction of piston rod 106 results in the opening of jaws 21, 22 to a second open position defined by a preselected second angle β. At full retraction of piston rod 106, rear surface 74 of connector member 70 will abuttingly contact front surface 82' of adjustment member 80. It will be recognized that in the second position front surface 82' of adjustment member acts as a contact or stop surface. Consequently, rotation of adjustment member 80 such that connector member 70 abuttingly contacts front 82' of adjustment member 80 shortens the stroke of jaw assembly 20, and results in jaws 21, 22 assuming angle β therebetween which is less than the angle α assumed in the first open position.

Adjustment member 80 may be adjusted between the first open position and the second open position by removing screws 86 and thereafter rotating adjustment member 80 in either a clockwise or counter-clockwise position until the desired position is obtained. Thereafter, screws 86 are reinserted in throughholes 34', 83 and 109.

It is important to recognize that by altering the thickness of adjustment member 80, the stroke of jaw assembly 20 may be increased or decreased as desired, and thus enable the angle between jaws 21 and 22 to be selectively chosen. That is, by varying the thickness of adjustment member 80, the angle defined by the second open position may be varied to any degree required by the particular application. The thickness, and the resultant angle of jaws 21, 22 is application specific, and is within the purview of one with ordinary skill in the art. In a preferred embodiment, the thickness of adjustment member 80 is approximately 0.25 inches resulting in an angle α of approximately 55° and an angle α of approximately 35°, when piston rod 106 has a length of approximately 1.25 inches when fully extended.

Turning now to FIGS. 8 through 10 there is shown an adjustment member 115 according to a preferred alternative embodiment. Adjustment member 115 includes a central aperture 116, a first pair of shoulders 118 and a second pair of shoulders 122. Shoulders 118' and 118" of first pair of shoulders 118 are diametrically opposed, as are shoulders 122' and 122" of second pair of shoulders 122. Preferably, shoulders 118' and 122' are integrally formed, as are shoulders 118" and 122", to define discrete members 124, 125 which are also diametrically opposed. The distance 126 between members 125 is slightly larger than the height of connector member 70 measured from bottom surface 70' to top surface 70". Furthermore, the distance 119 is also slightly larger than the height of connector member 70. Each shoulder 122', 122" of second pair of shoulders 122 projects a greater distance from front surface 117 of adjustment member 115 than does shoulders 118', 118" of first pair of shoulders 118.

In operation, adjustment member 115 permits the stroke of jaw assembly 20 to be modified between three discrete positions. In the first position, adjustment member 115 is positioned so that during retraction of piston rod 106, connector member 70 moves between members 124, 125 and abuttingly contacts front surface 117 at full retraction, and opens jaws 21, 22 to a preselected first open position defined by a first angle. Rotation of adjustment member 115 approximately 60° from the horizontal defined by dotted line 190 of FIG. 9 in either the clockwise or counter-clockwise direction will open jaws 21, 22 to a second open position defined by a second angle which is less than the first angle. In the second open position, at full retraction, rear surface 74 of connector member 70 will abuttingly contact top surfaces 120 of shoulders 118', 118" of first pair of shoulders 118. A third open position between jaws 21, 22 is achieved by rotation of adjustment member 115 approximately 120° from the horizontal in either a counter-clockwise or clockwise direction results in jaws 21, 22 opening to a third open position which is defined by a third angle less than the second angle or the first angle. In this position, during full retraction, rear surface 74 of connector member 70 will abuttingly contact top surface 123 of shoulders 122', 122".

The actual angles assumed by the first, second and third open position depends upon the thickness of adjustment member 115, and the distance at which first pair of shoulders 118 and second pair of shoulders 122 project from front surface 117, and can be varied by the artisan with ordinary skill in order to achieve any three discrete open positions as required by the particular application.

Figure 11:
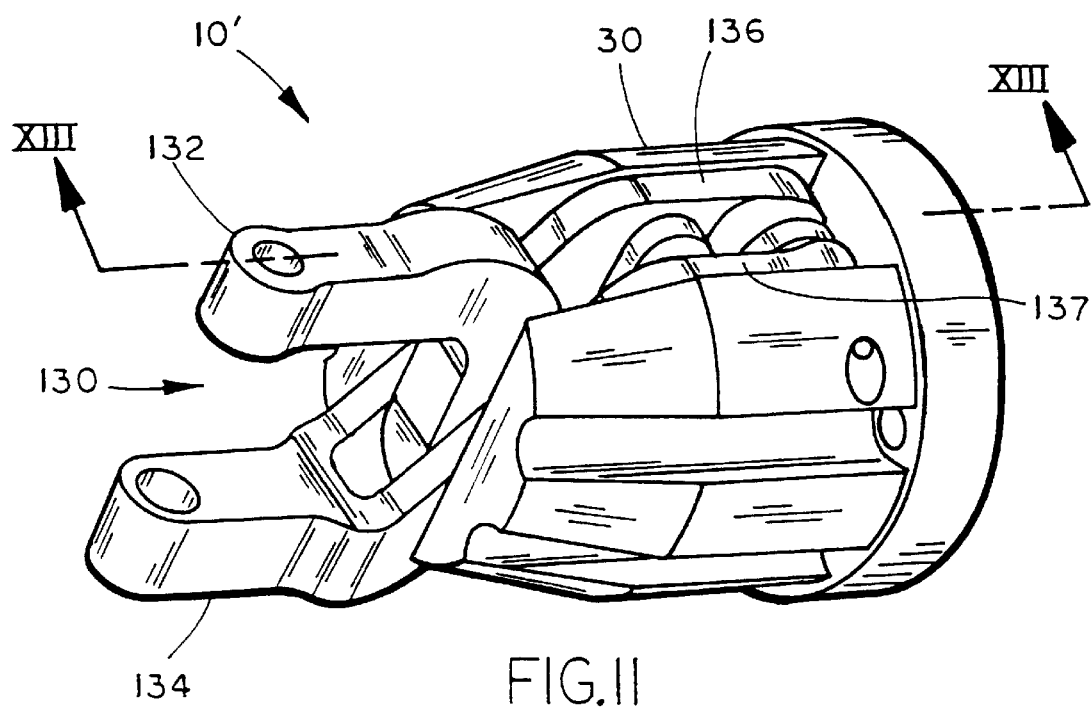
FIG. 11 is a perspective view of a gripper assembly, utilizing a jaw assembly according to an alternative preferred embodiment.
Figure 13:
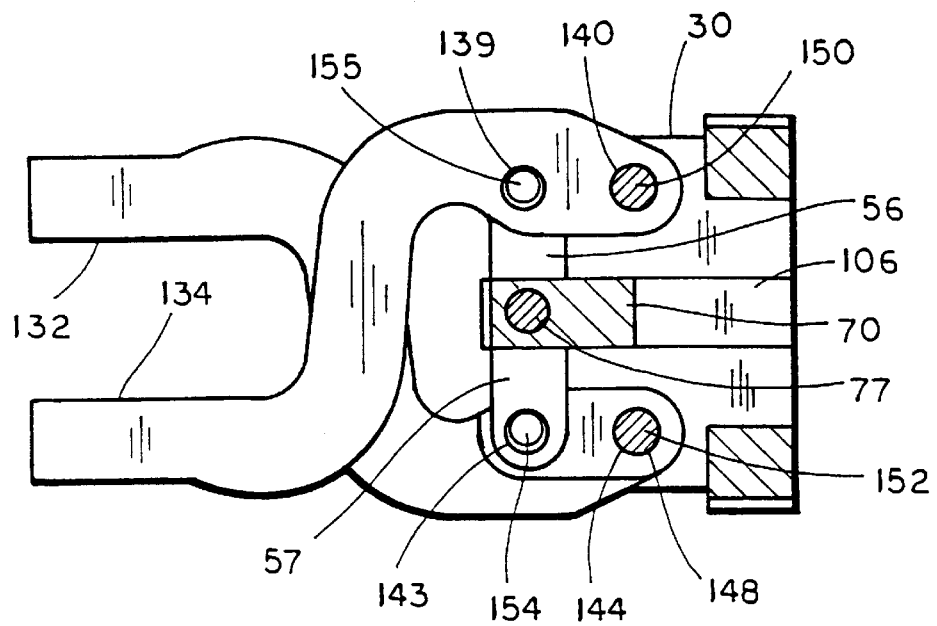
FIG. 13 is a sectional view taken along the line XIII—XIII of FIG. 11, with the jaw assembly illustrated in the closed position.

Turning now to FIGS. 11 through 14, there is shown a gripper assembly 10', according to an alternative preferred embodiment, including a jaw assembly 130 having a generally H shape when in the closed position of FIGS. 11 and 13. Jaw assembly 130 includes a first jaw 132, and a second jaw 134. Both first jaw 132, and second jaw 134, have a generally S-shape. Second jaw 134 includes a pair of spaced attachment arms 136 and 137, each of which has an attachment section 138 formed with a first throughhole 139 and a second throughhole 140. Attachment arms 136, 137 define a slot 141 therebetween. First jaw 132 is also formed having an attachment section 142 formed with a first throughhole 143 and a second throughhole 144. Although gripper assembly 10' is shown in conjunction with adjustment member 80, adjustment member 115 may also be used with gripper assembly 10'.

Flanges 36 of housing 30 are formed with a pair of top throughholes 146 and a pair of bottom throughholes 148, all of which are located proximate to base 34. Also, it will be recognized, in this embodiment, that throughholes 43 of flanges 36 and pivot pin 44 are not necessary and are eliminated.

Figure 14:
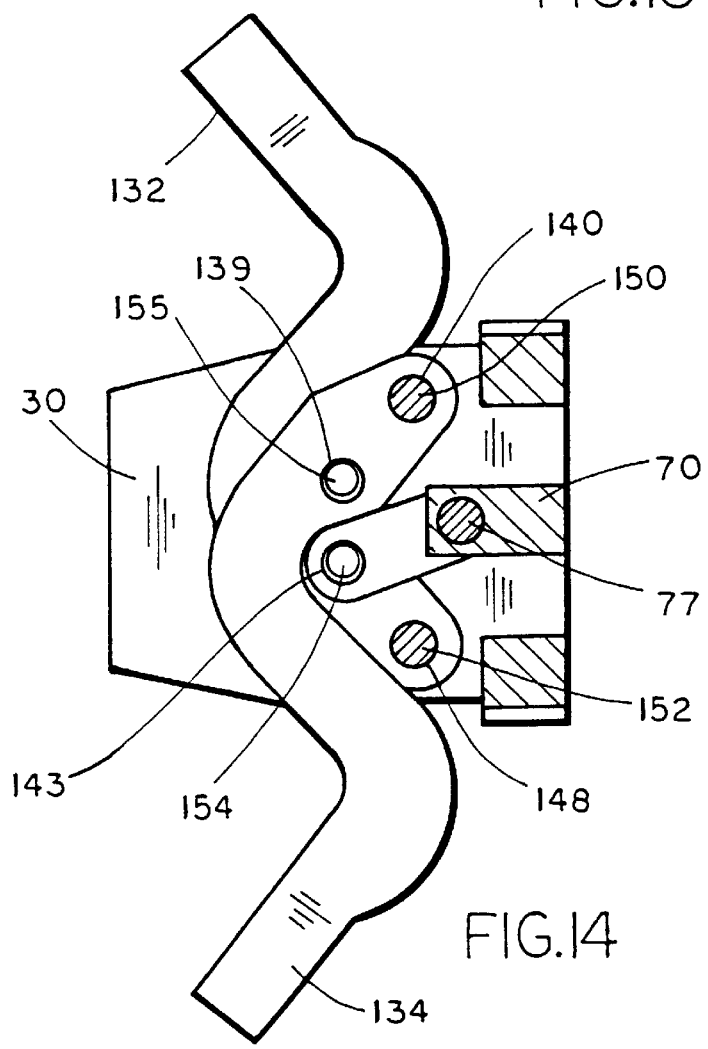
FIG. 14 is the same view as FIG. 13 with the jaw assembly illustrated in an open position.

Attachment of jaw assembly 130 to housing 30 is accomplished by placing a pivot pin 150 through top throughholes 146 of housing 30, and second throughholes 140 of second jaw 134. Similarly, a pivot pin 152 is placed through second throughhole 144 and bottom throughholes 148. Connector member 70 is attached to toggle assembly 50 in the same manner as detailed above, while toggle assembly 50 is attached to first jaw 132 by a pivot pin 154 placed through links 54, 57 at lower apertures 60, and second throughhole 143. Second jaw 134 is attached to toggle assembly 50 by placing a pivot pin 155 through upper apertures 59 of links 53 and 56, and first throughholes 139. In the assembled position, links 54 and 57 will be positioned against opposing sides 142' and 142" of attachment section 142 of first jaw 132. Also, both links 53 and 56 will be positioned between attachment arms 136, 137 of second jaw 134. As shown in FIGS. 13 and 14, pivot pins 150 and 152 provide pivot points about which jaws 132 and 134 pivot in response to retraction of the piston rod 106. When assembled, first jaw 132 extends through slot 141 defined by attachment arms 136, 137 of second jaw 134. Also, in the assembled position, a pair of spacers 158, formed with throughholes, are positioned between exterior surfaces 142', 142" of attachment section 142 and interior surfaces 54' and 57" of links 54 and 57. Also, spacers 159, formed with throughholes, are positioned between exterior surfaces 54" and 57' of links 54 and 57 and interior surfaces 36" of flanges 36.

Jaw assembly 130 may be adjusted to assume two discrete open positions by using adjustment member 80, or three discrete open positions when adjustment member 115 is utilized in the manner detailed above.

Figure 15:
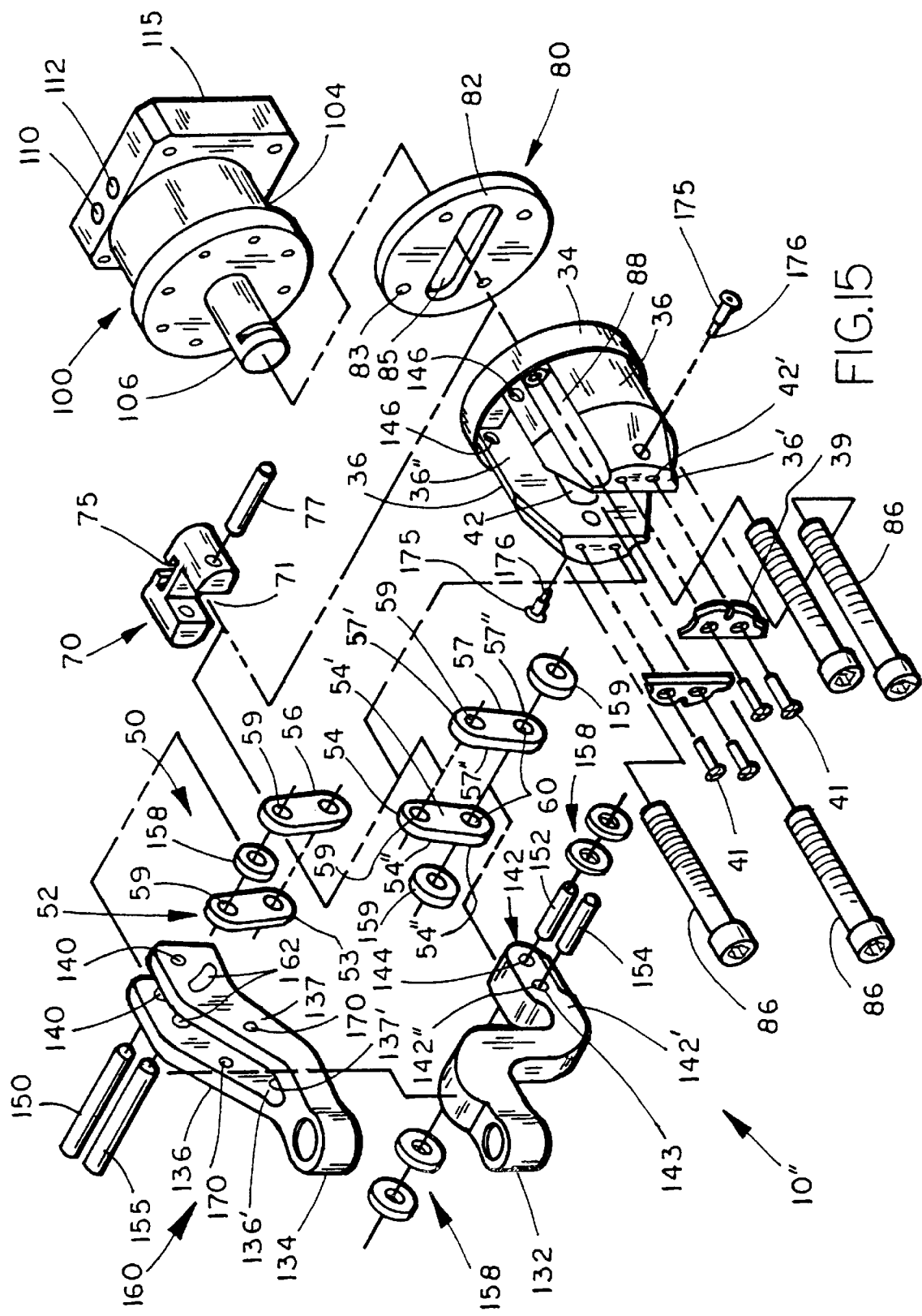
FIG. 15 is an exploded view of a gripper assembly utilizing a jaw assembly according to still another alternative preferred embodiment.
Figure 16:
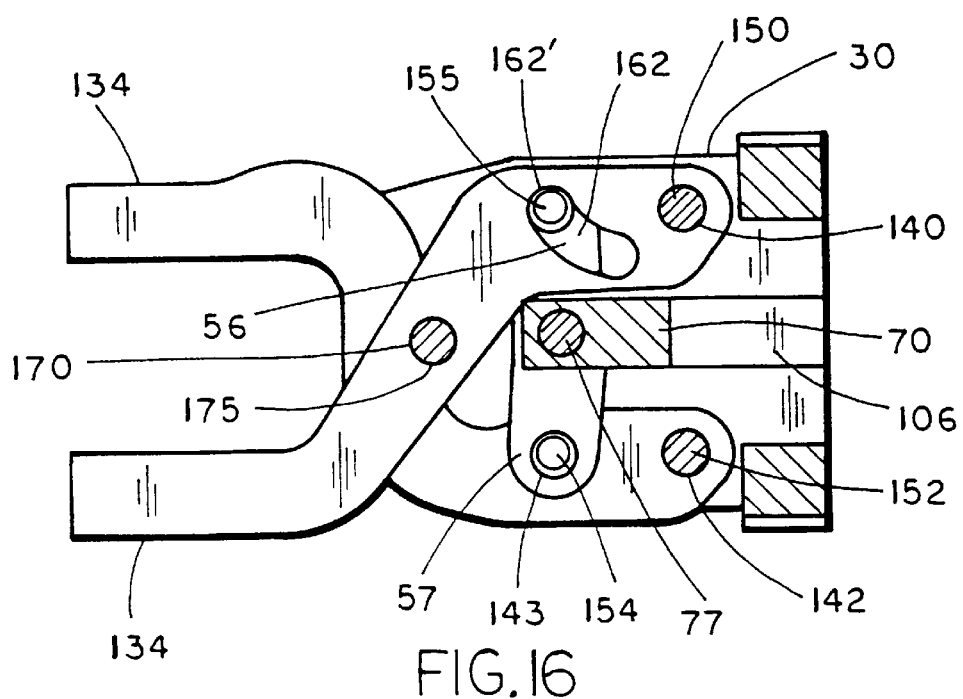
FIG. 16 is a sectional view with the jaw assembly of FIG. 15 illustrated in the closed position.
Figure 17:
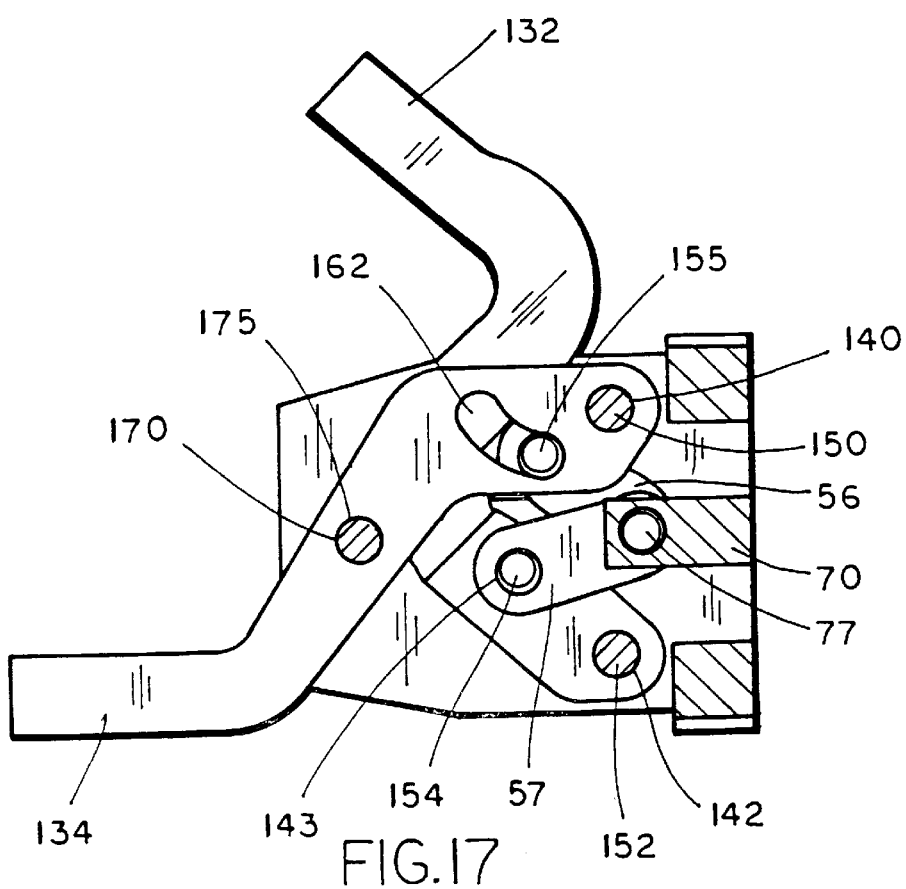
FIG. 17 is the same view as FIG. 16 with the jaw assembly illustrated in an open position.

Turning now to FIGS. 15 through 17, there is shown a gripper assembly 10" having an alternative preferred jaw assembly 160 which may be substituted for jaw assembly 130 of gripper assembly 10'. Jaw assembly 160 also has a generally H-shape when in the closed position. In jaw assembly 160, an arcuate slot 162 is formed in attachment arms 136, 137 of second jaw 134, while first throughhole 139, present in jaw assembly 130, is absent from jaw assembly 160. In addition, each attachment arm 136, 137 is formed with a throughhole 170. In the assembled position, throughholes 170 are in registry with throughholes 43 of housing 30, and a pin 175 is placed through each throughhole 43 and extends through throughholes 170 to thereby attach second jaw 134 between flanges 36. Ends 176 of pins 175 terminate at, and are roughly co-planar, with interior surfaces 136', 137' of attachment arms 136, 137, respectively. In all other aspects, jaw assembly 160 is structurally and functionally similar to jaw assembly 130.

In use, retraction of piston rod 106 results in the pivotal movement of first jaw 132 away from second jaw 134. However, pivot pin 155, positioned through upper apertures 59 of links 53, 56, as well as arcuate slots 164 of flanges 136, 137 of second jaw 134, travels along arcuate slot 164. During extension, pin 155 will abutting contact end 162' of arcuate slot 162 prior to full extension of piston rod 106. Continued extension of piston rod 106 will affect the slight rotational movement of second jaw 134, about pivot pin 150, towards first jaw 132. This slight rotation is necessary to balance the force placed upon connector member 70 when gripper assembly 10" grasps a workpiece in the closed position illustrated in FIG. 16.

It is to be understood that the above is a description of the preferred embodiments and that various modifications and improvements may be made without departing from the spirit and scope of the invention disclosed herein. The scope of protection afforded is to be measured by the claims which follow and the breadth of interpretation that the law allows, including the doctrine of equivalents.

The embodiments of the invention in which an exclusive property or privilege is claimed are defined as follows:

1. A gripper assembly for use with a drive assembly having a drive member, wherein the drive member has an extended position and a retracted position, said gripper assembly comprising:
   a housing connected to the drive assembly;
   a jaw assembly carried by said housing, said jaw assembly having a pair of jaws, said pair of jaws having a closed position when the drive member is in the extended position, and at least a first open position and a second open position when the drive member is in the retracted position, wherein said first open position defines a first angle between said pair of jaws and said second open position defines a second angle between said pair of jaws;
   a connection assembly operably connecting said jaw assembly to the drive member; and
   an adjustment member carried by said housing, said adjustment member having a first contact surface and movable between at least a first position and a second position, wherein said pair of jaws open to said first open position and said connection assembly does not contact said first contact surface when said adjustment member is in said first position, and wherein said pair of jaws open to said second open position and said connection assembly contacts said first contact surface when said adjustment member is in said second position.

2. The gripper assembly as recited in claim 1, wherein said connection assembly further comprises:
   a toggle assembly operably connected to said pair of jaws; and
   a connector member operably attached to said toggle assembly and the drive member, said connector member movable to a first position when said adjustment member is in said first position, and a second position when said adjustment member is in said second position.

3. The gripper assembly as recited in claim 2, wherein said connector member has an outer dimension and said adjustment member further comprises a plate having a central cutout formed therein, wherein said central cutout is dimensioned to enable at least a section of said connector member to pass therethrough when said plate is in said first position and the drive member is in the retracted position, wherein the drive member is positioned through said central cutout.

4. The gripper assembly as recited in claim 3, wherein said plate has a surface proximate to said connector member, and wherein said connector member abuts said surface when said plate is in said second position and the drive member is in the retracted position.

5. The gripper assembly as recited in claim 1, wherein said first angle is greater than said second angle.

6. The gripper assembly as recited in claim 3, wherein said plate has a center axis and is rotatable about said center axis to move said plate between said first position and said second position.

7. The gripper assembly as recited in claim 2, wherein said toggle assembly further comprises:
   a first toggle attached to said pair of jaws and said connector member; and
   a second toggle attached to said pair of jaws and said connector member.

8. The gripper assembly as recited in claim 7, wherein said pair of jaws further comprise a first jaw and a second jaw, wherein said first toggle includes a first link and a second link, each link having a first end and a second end, wherein said first end of said first link is pivotally joined to said first jaw and said second end of said second link is pivotally joined to said second jaw, wherein said second end of said first link and said first end of said second link are pivotally joined to said connector member.

9. The gripper assembly as recited in claim 7, wherein said second toggle includes a first link and a second link, each link having a first end and a second end, wherein said first end of said first link is pivotally joined to said first jaw and said second end of said second link is pivotally joined to said second jaw, wherein said second end of said first link and said first end of said second link are pivotally joined to said connector member.

10. The gripper assembly as recited in claim 1, wherein said pair of jaws are pivotally joined to said housing.

11. The gripper assembly as recited in claim 10, wherein said housing has a major axis and a throughhole formed substantially perpendicular to said major axis, wherein said pair of jaws are pivotally joined to said housing by a pin extending through said throughhole.

12. The gripper assembly as recited in claim 11, wherein each jaw of said pair of jaws is formed having at least one pivot member, wherein said at least one pivot member has a throughhole formed therethrough, said pin extending through said throughhole formed in said at least one pivot member.

13. The gripper assembly as recited in claim 2, wherein said housing further comprises:
 a base having a cut out formed therethrough and a front surface;
 a pair of spaced flanges extending from said front surface of said base and defining a slot therebetween, each flange having an inner surface formed with a channel dimensioned to slidingly receive at least a section of said connector member.

14. The gripper assembly as recited in claim 13, wherein said pair of jaws are pivotally attached to said housing and positioned in said slot.

15. The gripper assembly as recited in claim 14, wherein each flange of said pair of spaced flanges has an end, and wherein said channel formed in each flange of said pair of spaced flanges terminates a preselected distance from said end of each flange of said pair of spaced flanges.

16. The gripper assembly as recite in claim 15, wherein each flange of said pair of flanges has a throughhole having an axis substantially perpendicular to said channel, wherein said pair of jaws are pivotally joined to said housing by a pin extending through said throughhole formed in each flange of said pair of spaced flanges.

17. The gripper assembly as recited in claim 13, wherein said base has a rear surface and said adjustment member is adjustably attached to said rear surface.

18. The gripper assembly as recited in claim 1, wherein at least one jaw of said pair of jaws is pivotally attached to said housing.

19. The gripper assembly as recited in claim 1, wherein said adjustment member includes a third position and a second contact surface, and wherein said pair of jaws include a third open position, wherein said pair of jaws open to said third open position and said connection assembly contact said second contact surface when said adjustment member is in said third position and the drive member is in the retracted position.

20. The gripper assembly as recited in claim 19, wherein said third open position defines a third angle between said pair of jaws, wherein said first angle is greater than said second angle and said second angle is greater than said third angle.

21. The gripper assembly as recited in claim 19, wherein said adjustment member further comprises a plate having a center aperture and a front surface proximate to said connector member, said front surface having a shoulder assembly projecting therefrom.

22. The gripper assembly as recited in claim 21, wherein said shoulder assembly further comprises a first pair of shoulders, said first pair of shoulders being diametrically opposed.

23. The gripper assembly as recited in claim 22, wherein said shoulder assembly further comprises a second pair of shoulders, said second pair of shoulders being diametrically opposed.

24. The gripper assembly as recited in claim 23, wherein said connector member has a rear surface, said rear surface abuttingly contacting said front surface of said plate when the drive member is in the retracted position and said plate is in said first position, said connector member abuttingly contacting said first pair of shoulders when the drive member is in the retracted position and said plate is in said second position, said connector member abuttingly contacting said second pair of shoulders when the drive member is in the retracted position and said plate is in said third position.

25. The gripper assembly as recited in claim 23, wherein each first shoulder of said pair of first shoulders is integrally formed with a second shoulder of said pair of second shoulders.

26. The gripper assembly as recited in claim 23, wherein each shoulder of said first pair of shoulders projects a first preselected distance from said front surface of said adjustment member, and wherein each shoulder of said second pair of shoulders projects a preselected second distance from said front surface of said adjustment member, and wherein said second distance is greater than said first distance.

27. A gripper assembly for use with a drive assembly having a drive member, wherein the drive member has an extended position and a retracted position, said gripper assembly comprising a housing, a pair of jaws attached to the housing and operably connected to the drive member by a connector member, and an adjustment member carried by said housing and movable between at least a first position and a second position, said adjustment member having a stop surface selectively contacting said connector member such that when said adjustment member is in said first position said pair of jaws assume a first open position defining a first angle, and said pair of jaws assume a second open position defining a second angle when said adjustment member is in said second position, wherein when said adjustment member is in said second position said connector member contacts said stop surface, wherein said second angle is not equal to said first angle, and said second angle is determined by the spacing between said stop surface and the drive assembly.

28. The gripper assembly as recited in claim 27, further comprising a toggle assembly operably connected to said pair of jaws, and wherein said connector member is pivotally attached to said toggle assembly, said connector member movable to a first position when said adjustment member is in said first position, and a second position when said adjustment member is in said second position.

29. The gripper assembly as recited in claim 28, wherein said adjustment member further comprises a plate having a center aperture formed therein, wherein said center aperture is dimensioned to enable at least a section of said connector member to pass therethrough when said plate is in said first position and the drive member is in the retracted position.

30. A gripper assembly for use with a drive assembly having a drive member, wherein the drive member has an extended position and a retracted position, said gripper assembly comprising:

a housing connected to the drive assembly;

a pair of jaws carried by said housing, at least one jaw of said pair of jaws pivotally attached to said housing, said pair of jaws operable between a closed position when said drive member is in the extended position and at least first open position and a second open position when the drive member is in the retracted position;

a connector member attached to the drive member and slidingly received by said housing;

a first toggle attached to said pair of jaws and pivotally attached to said connector member;

a second toggle attached to said pair of jaws and pivotally attached to said connector member;

an adjustment plate having a central cutout formed therein through which the drive member is positioned, wherein said adjustment plate is adjustable between at least a first and a second position, wherein said central cutout is dimensioned to enable at least a section of said connector member to pass therethrough when said adjustment plate is in said first position and the drive member is in the retracted position, wherein said pair of jaws open to said first position when said section of said connector member passes through said adjustment plate.

31. The gripper assembly as recited in claim 30, wherein said pair of jaws further comprises a first jaw and a second jaw, wherein said first toggle includes a first link and a second link, each link having a first end and a second end, wherein said first end of said first link is pivotally joined to said first jaw and said second end of said second link is pivotally joined to said second jaw, wherein said second end of said first link and said first end of said second link are pivotally joined to said connector member.

32. The gripper assembly as recited in claim 30, wherein said second toggle includes a first link and a second link, each link having a first end and a second end, wherein said first end of said first link is pivotally joined to said first jaw and said second end of said second link is pivotally joined to said second jaw, wherein said second end of said first link and said first end of said second link are pivotally joined to said connector member.

33. The gripper assembly as recited in claim 31, wherein said pair of jaws are pivotally joined to said housing.

34. The gripper assembly as recited in claim 31, wherein said housing further comprises:

a base having a cutout formed therethrough and a front surface;

a pair of spaced flanges extending from said front surface of said base and defining a slot therebetween, each flange having an inner surface formed with a channel dimensioned to slidingly receive at least a section of said connector member.

35. A method for adjusting the stroke of a pair of jaws in a gripper assembly carried by a housing and operably connected to a drive member of a drive assembly by a connector member, wherein the pair of jaws can be opened to one of at least a first position defining a first angle, and a second position defining a second angle when the drive member is in a retracted position, wherein the first angle is not equal to the second angle, said method comprising the step of providing an adjustment member positioned between the drive assembly and the housing, said adjustment member having a preselected thickness and movable between at least a first position and a second position, wherein said adjustment member is configured to permit the pair of jaws to open to the first open position when said adjustment member is in said first position, and the second open position when said adjustment member is in said second position.

36. The method as recited in claim 35, wherein said adjustment member is a plate having a central aperture formed therein, said central aperture dimensioned to receive at least a section of the connector member when said adjustment member is in said first position and the drive member is retracted.

37. The method as recited in claim 35, wherein said adjustment member has a front surface and wherein the connector member abuts said front surface when said adjustment member is in said second position and the drive member is in the retracted position.

38. A gripper apparatus comprising:

a housing;

a pair of jaws carried by said housing, said pair of jaws having a closed position and at least a first open position and a second open position;

a drive assembly, said drive assembly having a drive member movable to a retracted position, and an adjustment member attached to one of said housing and said drive assembly, said adjustment member formed having a central aperture, said adjustment member movable between at least a first position and a second position, said drive member extending through said central aperture formed in said adjustment member and operably connected to said pair of jaws, wherein said pair of jaws open to said first open position when said adjustment member is in said first position and said drive member is in said retracted position, and said pair of jaws open to said second open position when said adjustment member is in said second position and said drive member is in said retracted position.

39. The gripper apparatus as recited in claim 38, further comprising:

a toggle assembly operably connected to said pair of jaws; and a connector member operably attached to said toggle assembly and said drive member, said connector member movable to a first position when said adjustment member is in said first position, and a second position when said adjustment member is in said second position.

40. The gripper apparatus as recited in claim 38, wherein said adjustment member is a plate having a center axis, wherein said plate is rotatable about said center axis to move said plate between said first position and said second position.

41. The gripper apparatus as recited in claim 38, wherein said central aperture formed in said adjustment member is dimensioned to enable at least a section of said connector member to extend therein when said adjustment member is in said first position and said drive member is in said retracted position.

42. The gripper apparatus as recited in claim 38, wherein said adjustment member includes a third position, and wherein said pair of jaws include a third open position, wherein said pair of jaws open to said third open position when said adjustment member is in said third position and the drive member is in said retracted position.

43. The gripper apparatus as recited in claim 42, wherein said first open position defines a first angle between said pair of jaws, said second open position defines a second angle between said pair of jaws, and said third open position defines a third angle between said pair of jaws, wherein said first angle is greater than said second angle and said second angle is greater than said third angle.

44. The gripper apparatus as recited in claim 43, wherein said adjustment member further comprises a plate having a front surface proximate to said connector member, said front surface having a shoulder assembly extending therefrom.

45. The gripper apparatus as recited in claim 44, wherein said shoulder assembly further comprises a first pair of shoulders, said first pair of shoulders being diametrically opposed.

46. The gripper apparatus as recited in claim 45, wherein said shoulder assembly further comprises a second pair of shoulders, said second pair of shoulders being diametrically opposed.

47. The gripper apparatus as recited in claim 46, wherein said connector member has a rear surface, said rear surface abuttingly contacting said front of said plate when said drive member is in the retracted position and said plate is in said first position, said connector member abuttingly contacting said first pair of shoulders when said drive member is in the retracted position and said plate is in said second position, and said connector member abuttingly contacting said second pair of shoulders when said drive member is in the retracted position and said plate is in said third position.

48. The gripper apparatus as recited in claim 46, wherein each first shoulder of said pair of first shoulders is integrally formed with a second shoulder of said second pair of shoulders.

49. The gripper apparatus as recited in claim 46, wherein each shoulder of said first pair of shoulders extends a first distance from said plate and wherein said each shoulder of said second pair of shoulders extends a second distance from said plate, wherein said first distance is less than said second distance.

50. A gripper assembly for use with a drive assembly having a drive member, wherein the drive member has an axis of travel, said gripper assembly comprising:
 a housing;
 a connector member movably positioned within said housing and operably connected to the drive member, said connector member moving in the axis of travel of the drive member;
 a toggle assembly pivotally connected to said connector member;
 a first jaw attached to said housing and pivotally joined to said connector member by said toggle assembly; and
 a second jaw attached to said housing and operably joined to said connector member by said toggle assembly, wherein said first jaw and said second jaw are operable between a closed position when said drive member is in the extended position and wherein said first and said second jaw define at least a first open position and a second open position when said drive member is in the retracted position; and
 an adjustment plate having a central cutout formed therein through which the drive member is positioned, wherein said adjustment plate is adjustable between at least a first and a second position, wherein said central cutout is dimensioned to enable at least a section of said connector member to pass therethrough when said adjustment plate is in said first position and the drive member is in the retracted position, wherein said pair of jaws open to said first position when said section of said connector member passes through said adjustment plate.

51. The gripper assembly as recited in claim 50, wherein said second jaw is pivotally joined to said connector member by said toggle assembly.

52. The gripper assembly as recited in claim 50, wherein said second jaw further comprises a pair of attachment arms, and wherein said first jaw extends between said pair of attachment arms.

53. The gripper assembly as recited in claim 50, further comprising:
 a base having a cut out formed therethrough and a front surface; and
 a pair of spaced flanges extending from said front surface of said base and defining a slot therebetween, each flange having an inner surface formed with a channel dimensioned to sliding receive at least a section of said connector member.

54. The gripper assembly as recited in claim 53, wherein said first jaw and said second jaw are positioned in said slot.

55. The gripper assembly as recited in claim 50, wherein said toggle assembly further comprises:
 a first toggle attached to said first jaw, said second jaw and said connector member; and
 a second toggle attached to said first jaw, said second jaw, and said connector member.

56. The gripper assembly as recited in claim 55, wherein said first toggle includes a first link and a second link, each link having a first end and a second end, wherein said first end of said first link is joined to said first jaw and said second end of said second link is joined to said second jaw, wherein said second end of said of said first link and said first end of said second link are pivotally joined to said connector member.

57. The gripper assembly as recited in claim 55, wherein said second toggle includes a first link and a second link, each link having a first end and a second end, wherein said first end of said first link is joined to said first jaw and said second end of said second link is joined to said second jaw, wherein said second end of said of said first link and said first end of said second link are pivotally joined to said connector member.

58. The gripper assembly as recited in claim 53, wherein each attachment arm of said pair of attachment arms of said second jaw further comprises an upper section having an arcuate slot formed therein, and wherein said toggle assembly further comprises a pin, said pin received by said arcuate slot formed in each attachment arm of said pair of attachment arms.

59. The gripper assembly as recited in claim 50, wherein said first jaw and said second jaw define a generally H-shape when in the closed position.

* * * * *

UNITED STATES PATENT AND TRADEMARK OFFICE
CERTIFICATE OF CORRECTION

PATENT NO.   : 6,361,095 B1
DATED        : March 26, 2002
INVENTOR(S)  : Keith S. Attee It is certified that error appears in the above-identified patent and that said Letters Patent is hereby corrected as shown below:

Column 5,
Line 9, insert -- 10 -- after "assembly"

Column 7,
Line 63, "angle α" should be -- angle β -- in the second occurrence

Signed and Sealed this

Twenty-fourth Day of June, 2003

JAMES E. ROGAN
*Director of the United States Patent and Trademark Office*